United States Patent [19]
Mizutani et al.

[11] Patent Number: 5,958,568
[45] Date of Patent: Sep. 28, 1999

[54] BIAXIALLY ORIENTED POLYESTER FILM FOR A MAGNETIC RECORDING MEDIUM

[75] Inventors: Kei Mizutani; Hideaki Watanabe, both of Sagamihara, Japan

[73] Assignee: Teijin Limited, Osaka, Japan

[21] Appl. No.: 08/811,191

[22] Filed: Mar. 5, 1997

[30] Foreign Application Priority Data

Mar. 7, 1996 [JP] Japan ..................... 8-049866

[51] Int. Cl.⁶ .......................... B32B 27/06; B32B 27/18; B32B 27/36
[52] U.S. Cl. .................... 428/216; 428/213; 428/215; 428/327; 428/328; 428/329; 428/339; 428/480; 428/694 ST; 428/910
[58] Field of Search ..................... 428/323, 327, 428/328, 329, 330, 331, 480, 694 ST, 694 SL, 694 SG, 910, 213, 215, 216, 339

[56] References Cited

U.S. PATENT DOCUMENTS

| | | | |
|---|---|---|---|
| 4,818,581 | 4/1989 | Katoh et al. | 428/143 |
| 5,006,589 | 4/1991 | Sakamoto et al. | 524/430 |
| 5,096,773 | 3/1992 | Sakamoto | 428/323 |
| 5,164,439 | 11/1992 | Sakamoto et al. | 524/425 |
| 5,270,096 | 12/1993 | Kato et al. | 428/143 |
| 5,429,855 | 7/1995 | Kotani et al. | 428/141 |
| 5,532,047 | 7/1996 | Okazaki et al. | 428/213 |
| 5,670,236 | 9/1997 | Kotani et al. | 428/141 |

FOREIGN PATENT DOCUMENTS

| | | |
|---|---|---|
| 0 635 824 A1 | 1/1995 | European Pat. Off. . |
| 1306220 | 12/1989 | Japan . |
| 36239 | 1/1991 | Japan . |

OTHER PUBLICATIONS

Abstract (JP 08104798 A), *Database WPI*, Week 9626, Apr. 23, 1996.
Abstract (JP 02206628 A), *Database WPI*, Week 9039, Aug. 16, 1990.

*Primary Examiner*—Vivian Chen
*Attorney, Agent, or Firm*—Sughrue, Mion, Zinn, Macpeak & Seas, PLLC

[57] ABSTRACT

A biaxially oriented polyester film for a magnetic recording medium, which is formed from a polyester composition comprising at least one member of fine particulate agglomerates selected from the group consisting of alumina fine particulate agglomerates and fine particulate agglomerates of a composite oxide comprising alumina and other metal oxide(s) in a proportion of 0.05 to 1% by weight of the polyester, the fine particulate agglomerates having an average particle diameter of 0.005 to 0.5 μm and having been surface-treated with an alkali metal salt of a polyvalent carboxylic acid; and other inert fine particles different from the above fine particulate agglomerates and having an average particle diameter of 0.2 to 2.0 μm in a proportion of 0.05 to 5% by weight of the polyester; and a biaxially oriented laminate polyester film for a magnetic recording medium comprising a polyester film layer of the above polyester composition as at least one surface layer.

18 Claims, No Drawings

BIAXIALLY ORIENTED POLYESTER FILM FOR A MAGNETIC RECORDING MEDIUM

BACKGROUND OF THE INVENTION

1. Field of the Invention

This invention relates to a biaxially oriented polyester film for a magnetic recording medium. More specifically, it relates to a biaxially oriented polyester film for a magnetic recording medium, which is excellent in abrasion resistance and scratch resistance and which exhibits electromagnetic conversion characteristics when it is formed into a magnetic tape.

2. Description of the Related Art

A biaxially oriented polyester film typified by a polyethylene terephthalate film is widely used as a base film for magnetic recording media such as magnetic tape, floppy disk and the like, owing to its excellent physical and chemical properties.

In the biaxially oriented polyester film, the scratch resistance and abrasion resistance of the film and the electromagnetic conversion characteristics of a magnetic tape formed therefrom are major factors of determining the quality of workability of the film production process and fabricating process and further the quality as a product thereof.

If the slipperiness of a biaxially oriented polyester film is insufficient, wrinkles will be produced or blocking will occur in the film when it is rolled and with the result of an uneven roll surface, a reduction in production yield will follow or appropriate ranges of tension, contact pressure and speed at the time of winding up a film will be narrowed, thereby making it extremely difficult to wind up the film. Further, when the film is fabricated into a magnetic tape and the tape is caused to run in a video tape recorder, if the slipperiness of the tape is unsatisfactory, running tension will increase with the result that stopping of running will occur or debris powders will be produced with the result that omission of a magnetic recording signal, i.e., a dropout will occur. When the tape is wounded up in a magnetic tape cassette, it is loosely wound, thereby causing unstable running in the video tape recorder (VTR). Or in the case of a magnetic tape wound on a reel called "pan cake roll" before being wound up in a cassette, deformation will arise due to the loose winding.

For application in VTRs in particular, in recent years, there have been frequently seen the cases where a metal guide or plastic guide whose surface is not perfectly finished is used for a guide post fixed in a cassette to reduce costs. The surface of such guide post is extremely rough. To cope with this problem, there has been proposed a method in which fine particles having a high Mohs hardness are incorporated to the film to reduce scratches (refer to JP-A 1-306220) (the term "JP-A" as used herein means an "unexamined published Japanese patent application"). In these days, there has been known an incorporation of alumina fine particles (refer to JP-A 3-6239).

However, if the fine particles are not fully dispersed in a film, the film may not exhibit sufficient abrasion resistance or scratch resistance even in these methods.

It is therefore an object of the present invention to provide a biaxially oriented polyester film for a magnetic recording medium.

It is another object of the present invention to provide a biaxially oriented polyester film for a magnetic recording medium having excellent abrasion resistance, scratch resistance and slipperiness.

It is still another object of the present invention to provide a biaxially oriented polyester film for a magnetic recording medium, in which alumina fine particulate agglomerates or fine particulate agglomerates of a composite oxide containing alumina is surface-treated with an alkali metal salt of a polyvalent carboxylic acid so that the fine particulate agglomerates are dispersed in a polyester uniformly without growing into a coarse agglomerate in the polyester and with less increasing the degree of agglomeration.

It is a further object of the present invention to provide a biaxially oriented polyester film for a magnetic recording medium, which is excellent in film slipperiness, abrasion resistance and prevention of the surface of the film from getting scratches by a guide pin having a rough surface, i.e., scratch resistance, and further is excellent in electromagnetic conversion characteristics as a magnetic tape formed therefrom.

It is a still further object of the present invention to provide a biaxially oriented laminate polyester film for a magnetic recording medium, which has the biaxially oriented polyester film of the present invention as at least one surface layer and which has excellent slipperiness such as running durability in spite of its flat surface and has, at the same time, improved abrasion resistance, scratch resistance and electromagnetic conversion characteristics as a magnetic tape formed therefrom.

Other objects and advantages of the present invention will become apparent from the following description.

SUMMARY OF THE INVENTION

According to the present invention, the above objects and advantages of the present invention are attained by a biaxially oriented polyester film for a magnetic recording medium, which is formed from a polyester composition comprising:

at least one kind of fine particulate agglomerates selected from the group consisting of alumina fine particulate agglomerates and fine particulate agglomerates of a composite oxide comprising alumina and other metal oxide(s) in a proportion of 0.05 to 1% by weight of the polyester, the fine particulate agglomerates having an average particle diameter of 0.005 to 0.5 $\mu$m and having been surface-treated with an alkali metal salt of a polyvalent carboxylic acid; and other inert fine particles different from the above fine particulate agglomerates and having an average particle diameter of 0.2 to 2.0 $\mu$m in a proportion of 0.05 to 5% by weight of the polyester.

DETAILED DESCRIPTION OF THE INVENTION

The other objects, constitution, advantages and effects of the present invention will become apparent from the following detailed description.

The polyester used in the present invention is an aromatic polyester comprising an aromatic dicarboxylic acid as a main acid component and an aliphatic glycol as a main glycol component. This polyester is substantially linear and has a film forming property, particularly a film forming property through melt molding.

Illustrative examples of the aromatic dicarboxylic acid include terephthalic acid, naphthalenedicarboxylic acid, isophthalic acid, diphenoxy ethane dicarboxylic acid, diphenyl dicarboxylic acid, diphenyl ether dicarboxylic acid, diphenyl sulfone dicarboxylic acid, diphenyl ketone dicarboxylic acid and anthracene dicarboxylic acid. Illustrative examples of the aliphatic glycol include polymethylene glycol having 2 to 10 carbon atoms such as ethylene glycol, trimethylene glycol, tetramethylene glycol, pentamethylene glycol, hexamethylene glycol and decamethylene glycol; and alicyclic diols such as 1,4-cyclohexane dimethanol.

In the present invention, the polyester preferably comprises, as the main constituents, alkylene terephthalate such as ethylene terephthalate and alkylene-2,6-naphthalene dicarboxylate such as ethylene-2,6-naphthalene dicarboxylate.

Of these polyesters, particularly preferred are polyethylene terephthalate, polyethylene-2,6-naphthalene dicarboxylate and a copolymer comprising terephthalic acid and/or 2,6-naphthalene dicarboxylate in an amount of not less than 80 mol % of the whole dicarboxylic acid component and ethylene glycol in an amount of not less than 80 mol % of the whole glycol component. Dicarboxylic acids other than the terephthalic acid and 2,6-naphthalene dicarboxylate may be contained in an amount of not more than 20 mol % of the whole acid component. The other dicarboxylic acids can be the above aromatic dicarboxylic acids; aromatic dicarboxylic acids such as adipic acid and sebacic acid; alicyclic dicarboxylic acids such as cyclohexane-1,4-dicarboxylate; and the like. Glycols other than ethylene glycol may be contained in an amount of not more than 20 mol % of the whole glycol component. The other glycols may be the above glycols; aromatic diols such as hydroquinone, resorcin and 2,2-bis(4-hydroxyphenyl)propane; polyalkylene glycol (polyoxyalkylene glycol) such as polyethylene glycol, polypropylene glycol and polytetramethylene glycol; and the like.

The polyester used in the present invention includes those prepared by copolymerizing or bonding an oxycarboxylic acid such as an aromatic oxyacid exemplified by hydroxybenzoic acid or an aliphatic oxyacid typified by ω-hydroxycaproic acid in an amount of not more than 20 mol % of the total amount of the dicarboxylic acid components and the oxycarboxylic acid components.

The polyester used in the present invention also includes a copolymer comprising a polyvalent carboxylic acid or a polyvalent hydroxy compound having 3 or more functional groups, such as trimellitic acid or pentaerythritol, in such an amount that it is substantially linear, e.g., in not more than 2 mol % of the whole acid component.

The polyester is known per se, and can be produced by a method known per se. The polyester preferably has an intrinsic viscosity, measured at 35° C. in an o-chlorophenol solution, of about 0.4 to 0.9.

The biaxially oriented polyester film of the present invention contains at least two different types of fine particles.

The first type of fine particles are alumina fine particulate agglomerates or fine particulate agglomerates of a composite oxide consisting of alumina and other metal oxide(s).

The fine particulate agglomerates have an average particle diameter of 0.005 to 0.5 μm. When the average particle diameter is larger than 0.5 μm, debris powders will be produced from the surface of the film and the amount of thereof will increase disadvantageously. On the other hand, when the average particle diameter is smaller than 0.005 μm, the surface of the film will be frequently scratched due to deterioration in scratch resistance.

The average particle diameter is preferably 0.05 to 0.25 μm, more preferably 0.08 to 0.15 μm.

The alumina fine particulate agglomerates preferably have δ, γ and/or θ type crystal structures, of which those having θ and/or γ type crystal structure(s) are particularly preferred. Alumina fine particles having an α type crystal structure are not preferred because they are apt to wear out a guide pin in a cassette when a tape is wound up in a video cassette, whereby electromagnetic conversion characteristics will deteriorate.

The molar ratio (Al/M) of aluminum atoms (Al) to metal atoms (M) contained in the other metal oxide(s) in the fine particulate agglomerates of the composite oxide is not less than 0.1, preferably not less than 1, more preferably not less than 10. To introduce a spinel crystal structure into the fine particulate agglomerates of the composite oxide to further exhibit this characteristic feature, the molar ratio (Al/M) is preferably not more than 50. In other words, the molar ratio of Al to M (metal atoms contained in the other metal oxide(s)) in the fine particulate agglomerates of the composite oxide is preferably 0.1:1 to 50:1 because high scratch resistance can be achieved when the molecular structure constituting the composite oxide is in a stable range. If the molar ratio is outside the above ranges, it is difficult to obtain a stable spinel crystal structure since the proportion of a metal element(s) other than Al contained in the fine particulate agglomerates of the composite oxide is too large or too small. As a result, the crystal structure of the fine particulate agglomerate becomes unstable, whereby the hardness of the particles and the scratch resistance are liable to deteriorate. The molar ratio is more preferably 1:1 to 50:1, particularly preferably 10:1 to 50:1.

The other metal oxide contained in the fine particulate agglomerates of the composite oxide is, for example, magnesium oxide, iron oxide or cobalt oxide. As a matter of course, it is not limited to these and may be other metal oxides. The metal oxide(s) to be compounded with alumina may be one kind or plural kinds. Fine particulate agglomerates of a composite oxide consisting of alumina and magnesium oxide or alumina and iron oxide are preferred because they further improve scratch resistance. Fine particulate agglomerates of a composite oxide comprising alumina and magnesium oxide are particularly preferred.

The fine particulate agglomerates preferably have an average agglomeration degree of 2 to 10. When the average agglomeration degree is more than 10, the dispersion of the particles becomes difficult, whereby scratch resistance is apt to deteriorate disadvantageously.

The average agglomeration degree is more preferably 3 to 7, particularly preferably 4 to 6.5. The primary particles constituting the fine particulate agglomerates preferably have an average particle diameter of not more than 40 nm.

The fine particulate agglomerates preferably have a Mohs hardness of 6 to 8.5, more preferably 7 to 8.5, particularly preferably 7 to 8.

The fine particulate agglomerates need to be surface-treated with an alkali metal salt of a polyvalent carboxylic acid in advance.

This surface treatment method is not limited to a particular one but may be, for example, a method which comprises mixing and milling an alkali metal salt of a polyvalent carboxylic acid and alumina fine particulate agglomerates or fine particulate agglomerates of a composite oxide with a ball mill which is frequently used for dry milling, or a method in which when alumina fine particulate agglomerates or the fine particulate agglomerates of a composite oxide are milled in a glycol slurry with a media dispersion type sand mill which is commonly used for wet milling, the alkali metal salt of a polyvalent carboxylic acid is further added thereto. Other appropriate methods other than these methods may be employable. These methods can be combined with purifying means for removing coarse particles by commonly used filtration or classification, and such combination is rather preferred.

The dispersibility of the fine particulate agglomerates in the polyester is greatly improved by the above surface treatment, thereby making it possible to further improve the abrasion resistance and scratch resistance of the film.

The alkali metal salt of a polyvalent carboxylic acid is preferably an alkali metal salt of a polyvalent carboxylic acid having 2 to 9 carbon atoms such as di- or trivalent carboxylic acid, particularly preferably an alkali metal salt of a divalent carboxylic acid.

It is enough if the alkali metal salt of a polyvalent carboxylic acid has at least one group of an alkali metal salt, and the group of the remaining salt may be an ester group or a free carboxyl group. The alkali metal salt of a polyvalent carboxylic acid is preferably a sodium salt or potassium salt of a polyvalent carboxylic acid.

If the number of carbon atoms of the polyvalent carboxylic acid is 10 or more, the resulting alkali metal salt will have a large molecular weight and in consequence, an effect on dispersion of the particles will be insufficient and it will be required in large quantity disadvantageously. Meanwhile, an alkali metal salt of a monocarboxylic acid can not exhibit a sufficient effect of dispersing the particles and hence, the quantity thereof must be increased considerably. An alkali metal salt of a polyvalent carboxylic acid such as tetra- or higher valent carboxylic acid is not preferred because a crosslinking reaction with a polyester or gelation is extremely ready to occur even with a small amount thereof.

The alkali metal salt of the polyvalent carboxylic acid may be either an anhydride or a hydrate. Preferred examples of the alkali metal salt of the polyvalent carboxylic acid include alkali metal salts of saturated and unsaturated aliphatic polyvalent carboxylic acids such as dipotassium oxalate, disodium oxalate, potassium hydrogen oxalate, sodium hydrogen oxalate, potassium sodium oxalate, dipotassium succinate, potassium sodium succinate, sodium hydrogen succinate, potassium hydrogen succinate, potassium maleate, sodium maleate, potassium sodium maleate, dipotassium tartrate, disodium tartrate, potassium sodium tartrate, potassium hydrogen tartrate, sodium hydrogen tartrate, mono- to tri-potassium salts and mono- to tri-sodium salts of citric acid and potassium salt and sodium salt of adipic acid; alkali metal salts of aromatic polyvalent carboxylic acids such as potassium salt and sodium salt of terephthalic acid; and the like. Of these, disodium succinate, dipotassium succinate, trisodium citrate, tripotassium citrate, disodium tartrate and dipotassium tartrate have a higher effect of dispersing fine particulate agglomerates after surface treatment, and above all, disodium succinate and dipotassium succinate have the excellent dispersion effect.

The alkali metal salt of a polyvalent carboxylic acid for the surface treatment is preferably used, as an alkali metal atom, in an amount of 0.05 to 2.0% by weight of the fine particulate agglomerates. When the amount is less than 0.05% by weight, the above dispersion effect will be insufficient, while when the amount is more than 2.0% by weight, the dispersion effect will become too strong with the result that the surface of the film becomes too flat, thereby promoting the production of debris powders due to its friction with the guide pin.

The amount is more preferably 0.1 to 1.0% by weight, particularly preferably 0.1 to 0.8% by weight.

In the present invention, the content of the fine particulate agglomerates is 0.05 to 1.0% by weight in view of exhibiting the scratch resistance of the film and from the economical standpoints. The content is preferably 0.1 to 0.7% by weight, more preferably 0.1 to 0.5% by weight.

In the present invention, the second type of fine particles are other inert fine particles different from the above fine particulate agglomerates and having an average particle diameter of 0.2 to 2.0 $\mu$m. The inert fine particles preferably have a Mohs hardness of not more than 6.

Preferred examples of the other inert fine particles include (1) silicon dioxide (including a hydrate thereof, quartz sand, quartz and the like); (2) silicates containing 30% by weight or more of $SiO_2$ [such as amorphous and crystalline clay minerals, aluminosilicate (including a calcined product and hydrate thereof), chrysotile, zircon, fly ash and the like]; (3) oxides of Mg, Zn, Zr and Ti; (4) sulfates of Ca and Ba; (5) phosphates (including monohydrogen salt and dihydrogen salt) of Li, Ba and Ca; (6) benzoates of Li, Na and K; (7) terephthalates of Ca, Ba, Zn and Mn; (8) titanates of Mg, Ca, Ba, Zn, Cd, Pb, Sr, Mn, Fe, Co and Ni; (9) chromates of Ba and Pb; (10) carbon (such as carbon black, graphite and the like); (11) glass (such as glass powders, glass beads and the like); (12) carbonates of Ca and Mg; (13) fluorite; (14) ZnS; (15) heat resistant polymer particles (such as crosslinked silicone resin particles, crosslinked acryl particles, crosslinked polystyrene particles, crosslinked styreneacryl crosslinked particles, crosslinked polyester particles, Teflon particles, polyimide particles, polyimide-amide particles, melamine resin particles and the like). Heat resistant polymer particles and synthetic inorganic compound particles (such as calcium carbonate, silica and the like) are more preferred. The heat resistance polymer particles to be used in the invention are those having a temperature for 5% heating loss under a nitrogen gas atmosphere of 310° C. or higher, preferably 330° C. or higher, more preferably 350° C. or higher. It is preferred that their particle diameter distribution is narrow with a relative standard deviation of not more than 0.4, more preferably not more than 0.3, particularly preferably not more than 0.2.

These inert fine particles have an average particle diameter of 0.2 to 2.0 $\mu$m, preferably 0.2 to 1.0 mm, particularly preferably 0.3 to 0.8 $\mu$m, and are preferably larger than the fine particulate agglomerates. If the average particle diameter of the inert fine particles is smaller than 0.2 $\mu$m, the surface of the film will become too flat with the result of deterioration in running property and abrasion resistance. On the other hand, if the particle diameter is larger than 2.0 $\mu$m, the surface of the film will become too rough with the result of deterioration in electromagnetic conversion characteristics.

The content of the inert fine particles is 0.05 to 5% by weight. If the content is less than 0.05% by weight, the surface of the film will become too flat with the result of deterioration in running property and abrasion resistance. On the other hand, if the content is more than 5% by weight, the surface of the film will become too rough with the result of deterioration in electromagnetic conversion characteristics. The content of the inert fine particles is preferably 0.1 to 1% by weight, more preferably 0.1 to 0.5% by weight.

The biaxially oriented polyester film of the present invention can be a single-layer film formed from a polyester composition comprising the above fine particulate agglomerates and other inert fine particles or a laminate film having a polyester film layer of the above polyester composition as at least one surface layer.

The laminate film can consist of two layers or three layers. It preferably consists of three layers. The laminate structure is preferred because protrusions produced by the inert fine particles near the surface have uniform height, thereby further improving slipperiness, abrasion resistance and electromagnetic conversion characteristics.

The polyesters (not polyester composition) of layers constituting the laminate film may be the same or different, while they are preferably the same.

When the laminate film consists of three layers, one or both surface layers may be formed from the above polyester composition.

In this case, when the surface layers are referred to as "layers A" (one surface layer is layer A1 and the other surface layer is layer A2) and the interlayer is referred to as "layer B", the total thickness of the surface layers A is preferably smaller than the thickness of the polyester layer B. That is, the total thickness of the both surface layers is preferably smaller than the thickness of the interlayer.

If the total thickness of the layers A is larger than that of the layer B, the surface of the film will not become flat and is liable to have the same characteristics as those of a single-layer film. The polyester layers A, that is, layers A1 and A2, may be the same in thickness, but it is preferred that the layer A1 differs from the layer A2 in the thickness by 0.5 $\mu$m or more to obtain excellent slipperiness and electromagnetic conversion characteristics at the same time. The difference is more preferably 1.0 $\mu$m or more. If the thickness of layers A1 and A2 is smaller than 0.1 $\mu$m, the polyester layer containing the inert fine particles will be too thin, the other inert fine particles contained in the polyester are likely to fall off, and slipperiness will deteriorate disadvantageously. Both layers A1 and A2 preferably have a thickness of 0.1 $\mu$m or more.

It is assumed that the reasons why the surface roughness of the film is small when the total thickness of the polyester layers A is smaller than that of the layer B are not only that the number of particles contained in the layers A reduces but also that height of protrusions produced by the inert particles is more likely to become uniform in the surface direction of the film as the thickness of the layers A decreases. When the layers A are made further thinner, the number of small protrusions on a surface is reduced and hence, the surface roughness becomes small.

The biaxially oriented polyester film of the present invention preferably has a total thickness of 5 to 25 $\mu$m, more preferably 5 to 20 $\mu$m, the most preferably 5 to 16 $\mu$m, regardless whether it is a single-layer or laminate film.

The polyester film of the present invention can be basically produced by any conventionally known method or any method accumulated in the industry. For example, it may be produced by first forming a single-layer or laminate unoriented film and then stretching it biaxially. The laminate unoriented film can be produced by a laminate film production method which has been accumulated in the industry. For example, it may be produced by a method which comprises laminating film layer(s) for forming surface layer(s) (polyester layers A) and a film layer for forming an interlayer (polyester layer B) while the polymers are in a molten state or in a cooled and solidified state. Stated more specifically, it can be produced by a method such as coextrusion or extrusion lamination.

An unoriented film laminated by the above method or a single-layer unoriented film can be further formed into a biaxially oriented film in accordance with a method for producing a biaxially oriented film which has been accumulated conventionally. For example, a single-layer unoriented film or a laminate unoriented film is stretched to 2.5 to 7.0 times in the monoaxial direction (longitudinal or transverse direction) at a temperature of (Tg–10)° C. to (Tg+70)° C. (Tg: glass transition point of the polyester) and then stretched to 2.5 to 7.0 times in the direction perpendicular to the above stretching direction (when the film is first stretched in the longitudinal direction, it is stretched in the transverse direction) at a temperature of Tg° C. to (Tg+70)° C. In this case, the area stretch ratio is preferably 9 to 35, more preferably 12 to 35. Stretching means may be either simultaneous biaxial stretching or successive biaxial stretching. Further, the biaxially oriented film can be heat set at a temperature of (Tg+70)° C. to Tm° C. (Tm: melting point of the polyester). For example, a single-layer or laminate polyethylene terephthalate film is preferably heat set at 190 to 230° C. The heat setting time is 1 to 60 sec, for example.

Of the polyester films of the present invention, in the production of a laminate polyester film in particular, it is possible to recover an edge portion and the like of a biaxially oriented film which could not be a final product and has been thrown away by a simple recovering apparatus and reuse the recovered polyester as a polymer for an interlayer if it satisfies the above conditions. As a result, the laminate polyester film of the present invention has such an advantage that it can supply at a low cost a biaxially oriented polyester film which is excellent in abrasion resistance and scratch resistance and can give excellent electromagnetic conversion characteristics when it is formed into a magnetic recording medium such as a magnetic tape.

Various physical values and characteristic properties in the present invention are measured in accordance with the following methods and defined as such.

(1) Average (secondary) particle diameter of alumina fine particulate agglomerates or fine particulate agglomerates of a composite oxide consisting of alumina and other metal oxide(s)

A film containing particles is sliced in the sectional direction to prepare a ultrathin piece of 100 nm in thickness, and when the particles are observed at a magnification of 100,000× using a transmission electron microscope (such as JEM-1200EX of Japan Electronics Co.), agglomerated particles (secondary particles) can be observed. This photo is used to measure the area circle equivalent diameter of each particle for 1,000 particles, using an image analyzer or the like. The average particle diameter of the particles is taken as the average particle diameter of the alumina fine particulate agglomerates or the fine particulate agglomerates of a composite oxide consisting of alumina and other metal oxide. The kind of particle is identified through the quantitative analysis of a metal element with SEM-XMA or ICP.

(2) Average agglomeration degree of alumina fine particulate agglomerates or fine particulate agglomerates of a composite oxide consisting of alumina and other metal oxide The number of primary particle (minimum particles which cannot be divided further) forming each secondary particle is counted for 1,000 secondary particles observed from the photo obtained for the above measurement of the average (secondary) particle diameter, and a value obtained by dividing the total number of primary particles by 1,000 is taken as an average agglomeration degree.

(3) Average particle diameter (DP) of inert fine particles other than alumina fine particulate agglomerates and fine particulate agglomerates of a composite oxide consisting of alumina and other metal oxide This is measured using the CP-50 Model centrifugal particle diameter analyzer of Shimadzu Corporation. A particle diameter equivalent to 50 mass percent is read from a cumulative curve of the particles of each size and the quantity thereof calculated based on the obtained centrifugal sedimentation curve, and this value is taken as the above average particle diameter (refer to Book "Particle Size Measurement Technology" published by Nikkan Kogyo Press, pp. 242–247, 1975).

(4) Mohs hardness of alumina fine particulate agglomerates and fine particulate agglomerates of a composite oxide consisting of alumina and other metal oxide After the alumina fine particulate agglomerates or the fine particulate agglomerates of a composite oxide consisting of alumina and other metal oxide are purified, the resulting purified particles are measured by a hardness meter.

(5) Amounts of alumina fine particulate agglomerates and fine particulate agglomerates of a composite oxide consisting of alumina and other metal oxide and other inert fine particles 100 g of a polyester film is burnt in a furnace heated at around 1,000° C. in a platinum crucible for 3 hours or more, the burnt product in the crucible is mixed with terephthalic acid (powder) to form a 50 g tablet-form plate, and a count value for each element is calculated from a calibration curve for each element prepared in advance using a wavelength dispersion fluorescent X ray to determine the amount of particles added. An X-ray tube for measuring a fluorescent X ray is preferably a Cr tube or may be an Rh tube. The output of the X ray is set to 4 kW and the spectral crystal is changed for each element to be measured.

(6) Surface roughness (Ra) of film

This is a value defined as center line average roughness (Ra) in accordance with JIS-B0601 and measured using a tracer type surface roughness meter (SURFCORDER SE-30C of Kosaka Kenkyusho Co. Ltd.) Measurement conditions are as follows.

(a) tracer end radius: 2 $\mu$m
(b) measurement pressure: 30 mg
(c) cut-off: 0.25 mm
(d) measurement length: 2.5 mm
(e) collection of data: The same sample is measured six times and the average of five measurement values excluding the largest one is taken.

(7) High-speed pin abrasion (abrasion resistance, scratch resistance)

A ½-in. wide cut film is brought into contact with a fixed guide pin, which is made by bending an SUS sintered plate into a cylindrical shape and has an incompletely finished surface (surface roughness Ra=0.15 nm), at an angle $\theta=(60/180)\pi$ radian (60°) at a temperature of 20° C. and a humidity of 60% and is caused to run (friction) at a speed of 250 m/min and a tension ($T_1$) at the inlet of 50 g. After the film ran 200 m, debris powders adhered to the surface of the fixed guide pin and the number of scratched on the film after running are evaluated.

<Criterion of Debris Powders>
◎: No debris powders are observed.
○: A slight amount of debris powders is observed.
Δ: The presence of debris powders is observed at a glance.
X: A large amount of debris powders are adhered.

<criterion of scratch>
◎: No scratches are observed.
○: 1 to 5 scratches are observed.
Δ: 6 to 15 scratches are observed.
X: 16 or more scratches are observed.

(8) Electromagnetic conversion characteristics

A VHS-type VTR (BR6400 of Victor Company of Japan, Limited) which has been remodelled is used. A 4 MHz sine wave is applied to a record/reproduction head through an amplifier, recorded on a magnetic tape and reproduced, and its reproduced signal is applied to a spectrum analyzer. Noise generated at a frequency 0.1 MHz apart from the 4 MHz of a carrier signal is measured and the carrier/noise ratio (C/N) is expressed in the unit of dB. The above magnetic tape is measured using this method, a value obtained in Comparative Example 1 is taken as a standard (±0 dB) and the difference between the standard and the value of the magnetic tape is taken as electromagnetic conversion characteristics.

<Criterion of Electromagnetic Conversion Characteristics>
◎: 2 dB≦C/N
○: 0 dB≦C/N<2
Δ: C/N=0 dB
X: 0≧C/N The magnetic tape is obtained by the following method.

100 parts by weight (to be simply referred to as "parts" hereinafter) of $\gamma$-$Fe_2O_3$ and the following composition are kneaded and dispersed with a ball mill for 12 hours.

| | |
|---|---|
| polyester polyurethane | 12 parts |
| vinyl chloride-vinyl acetate-maleic anhydride copolymer | 10 parts |
| α-alumina | 5 parts |
| carbon black | 1 part |
| butyl acetate | 70 parts |
| methyl ethyl ketone | 35 parts |
| cyclohexanone | 100 parts |

After dispersion, the following materials are further added and kneaded for 10 to 30 minutes.

| | |
|---|---|
| fatty acid: oleic acid | 1 part |
| fatty acid: palmitic acid | 1 part |
| fatty acid: ester (amyl stearate) | 1 part |

Further, 7 parts of a 25% ethyl acetate solution of a triisocyanate compound is added, and the mixture is dispersed by a high-speed shearing machine for 1 hour to prepare a magnetic coating solution.

The thus obtained coating solution is applied to a polyester film (to the side of a polyester layer A1) to ensure that the thickness of a dry film becomes 3.5 $\mu$m. Thereafter, the film is oriented in a DC electromagnetic field and dried at 100° C. After drying, it is subjected to calendering and slit to a width of ½ inch to obtain a magnetic tape.

(9) Blade abrasion

A ½-in. wide cut film is brought into contact with the edge of a blade (blade for testing an industrial razor, a product of the GKI in USA) at an angle $\theta=(6/180)\pi$ radian (6°) at a temperature of 20° C. and a humidity of 60% and caused to run (friction) at a speed of 100 m/min and a tension ($T_1$) at the inlet of 50 g. The amount of debris powders adhered to the blade after the film ran 100 m is evaluated. This evaluation relates to the impact strength of protrusions formed on the surface of the film and well corresponds to the generation of debris powders by calendering and a die coater in the production process of a magnetic tape.

<Criterion>
◎: The width of debris powders adhered to the edge of a blade is less than 0.5 mm.
○: The width of debris powders adhered to the edge of a blade is 0.5 or more and less than 1.0 mm.
Δ: The width of debris powders adhered to the edge of a blade is 1.0 mm or more and less than 2.0 mm.
X: The width of debris powders adhered to the edge of a blade is 2.0 mm or more.

The following examples are given to further illustrate the present invention.

EXAMPLES 1 TO 9 and COMPARATIVE EXAMPLES 1 TO 6

To dimethyl terephthalate and ethylene glycol were added manganese acetate as an ester exchange catalyst, antimony trioxide as a polymerization catalyst, phosphorous acid as a stabilizer, and particles shown in Tables 1 and 2 as a lubricant (added to a surface layer in the case of a laminate film), and the mixture was subjected to polymerization in accordance with a commonly used method to obtain polyethylene terephthalate having an intrinsic viscosity of 0.56 (orthochlorophenol, 35°C.) (used for polyester layers A in the case of a laminate film).

In the case of a laminate film, single-layer film wastes were collected and mixed with the same type of polyester containing no lubricant in a ratio of 1:1 to obtain a polyester for an intermediate layer.

These polyester pellets were dried at 170° C. for 3 hours, supplied to a hopper of an extruder (two extruders in the case of a laminate film) and molten at 280 to 300° C. The molten polyester was extruded through a die (a multi-manifold type coextruder die in the case of a laminate film) onto a rotary cooling drum having a surface finishing of about 0.3 s and a surface temperature of 20° C. from a single-layer I type die (In the case of a laminate, multi-manifold type coextrusion dies were used and each layer A was laminated on both sides of layer B.) to obtain a 200 μm-thick unoriented (laminate) film. In the case of a laminate film, a layer faced to the drum surface was layer A1 and a layer on the opposite side (not faced to the drum surface) was layer A2.

The thus obtained unoriented (laminate) film was preheated at 75° C., further heated between low-speed and high-speed rolls from 15 mm above by three IR heaters having a surface temperature of 800° C. to be stretched to 3.2 times, quenched and supplied to a stenter to be stretched to 4.3 times in the transverse direction. The thus obtained biaxially oriented film was heat set at 205° C. for 5 sec. to obtain a 14 μm-thick heat set biaxially oriented polyester single-layer film or laminate film.

The thickness of each layer of a coextruded film was adjusted by changing the amount discharged of the two extruders. When the polyester layer A1 and the polyester layer A2 differed in thickness, the thickness of each layer was adjusted by narrowing one passage. The thickness of each layer was obtained by using both a fluorescent X-ray method and a method in which a film was sliced into a thin piece and its interfaces were detected through a transmission electron microscope.

The characteristic properties of the thus obtained films are shown in Tables 1 and 2. As is evident from Tables 1 and 2, the biaxially oriented polyester film for a magnetic recording medium, provided by the present invention, is excellent in abrasion resistance and scratch resistance, and exhibits extremely excellent electromagnetic conversion characteristics when it is formed into a magnetic tape.

TABLE 1

|  |  |  | Example 1 | Example 2 | Example 3 | Example 4 |
|---|---|---|---|---|---|---|
| Surface treating agent | Kind |  | disodium succinate | disodium succinate | dipotassium tartrate | dipotassium tartrate |
|  | Water of crystallization |  | hexahydrate | hexahydrate | ½ hydrate | ½ hydrate |
|  | Amount | % | 0.7 | 0.7 | 0.9 | 0.9 |
| Inert fine particles A | Kind |  | composite oxide | composite oxide | composite oxide | composite oxide |
|  | Element other than Al |  | Mg | Mg | Mg | Mg |
|  | Molar ratio | Al:M | 12:1 | 12:1 | 20:1 | 20:1 |
|  | Secondary particles | μm | 0.11 | 0.11 | 0.11 | 0.11 |
|  | Agglomeration degree |  | 4 | 4 | 4.2 | 4.2 |
|  | Mohs hardness |  | 7.8 | 7.8 | 7.7 | 7.7 |
|  | Amount | wt % | 0.3 | 0.3 | 0.3 | 0.3 |
| Inert fine particles B | Kind |  | calcium carbonate | calcium carbonate | spherical crosslinked silicon resin | spherical crosslinked silicon resin |
|  | Average particle size | μm | 0.6 | 0.6 | 0.6 | 0.6 |
|  | Amount | wt % | 0.25 | 0.25 | 0.12 | 0.12 |
| Film layer structure |  |  | laminate | single layer | laminate | single layer |
| Film thickness |  | μm | 14 | 14 | 14 | 14 |
| Layer A1 thickness/Layer A2 thickness |  | μm | 1.0/2.5 | — | 2.0/2.0 | — |
| Layer B thickness |  | μm | 10.5 | — | 10.0 | — |
| Film characteristics | Scratch resistance |  | ⊚ | ⊚ | ⊚ | ⊚ |
|  | Abrasion resistance |  | ⊚ | ⊚ | ⊚~○ | ○ |
|  | Electromagnetic conversion characteristics |  | ⊚ | ○ | ○ | ○ |

|  |  |  | Example 5 | Example 6 | Example 7 | Example 8 | Example 9 |
|---|---|---|---|---|---|---|---|
| Surface treating agent | Kind |  | trisodium citrate | trisodium citrate | disodium maleate | disodium maleate | disodium succinate |

TABLE 1-continued

|  |  |  |  |  |  |  |  |
|---|---|---|---|---|---|---|---|
|  | Water of crystallization |  | none | none | none | none | hexahydrate |
| Inert fine particles A | Amount | % | 1 | 1 | 0.7 | 0.7 | 0.7 |
|  | Kind |  | alumina | alumina | composite oxide | composite oxide | composite oxide |
|  | Element other than Al |  | — | — | Fe | Fe | Mg |
|  | Molar ratio | Al:M | — | — | 8:1 | 8:1 | 12:1 |
|  | Secondary particles | μm | 0.09 | 0.09 | 0.14 | 0.14 | 0.11 |
|  | Agglomeration degree |  | 4.1 | 4.1 | 3.8 | 3.8 | 4 |
|  | Mohs hardness |  | 8.1 | 8.1 | 8 | 8 | 7.8 |
|  | Amount | wt % | 0.3 | 0.3 | 0.3 | 0.3 | 0.3 |
| Inert fine particles B | Kind |  | spherical silica | spherical silica | kaolin | kaolin | calcium carbonate |
|  | Average particle size | μm | 0.6 | 0.6 | 0.6 | 0.6 | 0.6 |
|  | Amount | wt % | 0.3 | 0.3 | 0.3 | 0.3 | 0.25 |
| Film layer structure |  |  | laminate | single layer | laminate | single layer | laminate |
| Film thickness |  | μm | 14 | 14 | 14 | 14 | 14 |
| Layer A1 thickness/Layer A2 thickness |  | μm | 1.0/2.0 | — | 2.0/2.0 | — | 2.0/2.0 |
| Layer B thickness |  | μm | 11.0 | — | 10.0 | — | 10.0 |
| Film characteristics | Scratch resistance |  | ◉ | ○ | ○ | ○ | ◉~○ |
|  | Abrasion resistance |  | ○ | ○ | ◉~○ | ○ | ◉~○ |
|  | Electromagnetic conversion characteristics |  | ○ | ○ | ○ | ○ | ◉ |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Surface treating agent | Kind |  | potassium acetate | potassium acetate | sodium hydroxide | sodium hydroxide | potassium hydroxide | potassium hydroxide |
|  | Water of crystallization |  | none | none | none | none | none | none |
| Inert fine particles A | Amount | % | 0.8 | 0.8 | 0.7 | 0.7 | 1 | 1 |
|  | Kind |  | composite oxide | composite oxide | alumina | alumina | alumina | alumina |
|  | Element other than Al |  | Mn | Mn | — | — | — | — |
|  | Molar ratio | Al:M | 60:1 | 60:1 | — | — | — | — |
|  | Secondary particles | μm | 0.08 | 0.08 | 0.11 | 0.11 | 0.14 | 0.14 |
|  | Agglomeration degree |  | 6.1 | 6.1 | 7.8 | 7.8 | 7.3 | 7.3 |
|  | Mohs hardness |  | 8.3 | 8.3 | 8.6 | 8.6 | 8.6 | 8.6 |
|  | Amount | wt % | 0.3 | 0.3 | 0.3 | 0.3 | 0.3 | 0.3 |
| Inert fine particles B | Kind |  | carcium carbonate | carcium carbonate | carcium carbonate | carcium carbonate | carcium carbonate | carcium carbonate |
|  | Average particle size | μm | 0.6 | 0.6 | 0.6 | 0.6 | 0.6 | 0.6 |
|  | Amount | wt % | 0.25 | 0.25 | 0.25 | 0.25 | 0.25 | 0.25 |
| Film layer structure |  |  | laminate | single layer | laminate | single layer | laminate | single layer |
| Film thickness |  | μm | 14 | 14 | 14 | 14 | 14 | 14 |
| Layer A1 thickness/Layer A2 thickness |  | μm | 2.0/2.0 | — | 2.0/2.0 | — | 2.0/2.0 | — |
| Layer B thickness |  | μm | 10.0 | — | 10.0 | — | 10.0 | — |
| Film characteristics | Scratch resistance |  | ○ | ○ | ○~Δ | Δ | Δ | Δ |
|  | Abrasion resistance |  | ○~Δ | Δ | Δ | Δ | Δ | X |
|  | Electromagnetic conversion characteristics |  | Δ | Δ | ○ | ○ | ○~Δ | Δ |

What is claimed is:

1. A biaxially oriented polyester film for a magnetic recording medium, which is formed from a polyester composition comprising:

at least one member of fine particulate agglomerates selected from the group consisting of alumina fine particulate agglomerates and fine particulate agglomerates of a composite oxide comprising alumina and other metal oxide(s) in a proportion of 0.05 to 1% by weight of the polyester, the fine particulate agglomerates having an average particle diameter of 0.005 to 0.5 µm and having been surface-treated with an alkali metal salt of a polyvalent carboxylic acid; and other inert fine particles different from the above fine particulate agglomerates and having an average particle diameter of 0.2 to 2.0 µm in a proportion of 0.05 to 5% by weight of the polyester.

2. The polyester film of claim 1, wherein the fine particulate agglomerates have an average agglomeration degree of 2 to 10.

3. The polyester film of claim 1, wherein the average particle diameter of primary particles constituting the fine particulate agglomerates is not larger than 40 nm.

4. The polyester film of claim 1, wherein the fine particulate agglomerates have a Mohs hardness of 6 to 8.5.

5. The polyester film of claim 1, wherein the fine particulate agglomerates of the composite oxide have an atomic ratio of aluminum atoms (Al) to other metal atoms of at least 0.1.

6. The polyester film of claim 1, wherein the alkali metal salt of a polyvalent carboxylic acid is an alkali metal salt of a divalent or trivalent carboxylic acid having 2 to 9 carbon atoms.

7. The polyester film of claim 1, wherein the alkali metal salt of a polyvalent carboxylic acid has at least one alkali metal salt group of a carboxylic acid.

8. The polyester film of claim 1, wherein the alkali metal salt of a polyvalent carboxylic acid is a sodium salt or potassium salt of a polyvalent carboxylic acid.

9. The polyester film of claim 1, wherein the alkali metal salt of a polyvalent carboxylic acid for surface treatment is used in a proportion of 0.05 to 2.0% by weight of alkali metal atom based on the amount of fine particle agglomerates.

10. The polyester film of claim 1, wherein the other inert fine particles have a Mohs hardness of not more than 6.

11. The polyester film of claim 1, wherein the average particle diameter of the inert fine particles different from the fine particulate agglomerate is larger than that of the fine particulate agglomerate.

12. The polyester film of claim 1, wherein the other inert fine particles are heat resistant polymer fine particles or synthetic inorganic compound fine particles.

13. The polyester film of claim 1, wherein the polyester comprises ethylene terephthalate or ethylene-2,6-naphthalene dicarboxylate as a main recurring unit.

14. A biaxially oriented laminate polyester film for a magnetic recording medium, which comprises a polyester film layer of the polyester composition recited in claim 1 as at least one surface layer.

15. The laminate polyester film of claim 14 which consists of a first layer, an interlayer and a second surface layer wherein both surface layers are formed from the polyester composition recited in claim 1.

16. The laminate polyester film of claim 15, wherein the total thickness of the first and second surface layers is smaller than the thickness of the interlayer.

17. The laminate polyester film of claim 15, wherein the difference of thickness between the first layer and the second layer is no smaller than 0.5 µm.

18. The polyester film of claim 1 or the laminate polyester film of claim 14 having a thickness of 5 to 25 µm.

* * * * *